US011467090B1

(12) United States Patent
Gasda et al.

(10) Patent No.: US 11,467,090 B1
(45) Date of Patent: Oct. 11, 2022

(54) SINGLE DETECTOR LASER-INDUCED FLUORESCENCE IMAGER AND RAMAN SPECTRAL INSTRUMENT

(71) Applicants: Triad National Security, LLC, Los Alamos, NM (US); University of Hawaii, Manoa, Honolulu, HI (US)

(72) Inventors: Patrick J. Gasda, Los Alamos, NM (US); Roger Craig Wiens, Los Alamos, NM (US); Steven P. Love, Los Alamos, NM (US); Samuel M. Clegg, Los Alamos, NM (US); Anupam Misra, Honolulu, HI (US); Tayro Acosta-Maeda, Honolulu, HI (US)

(73) Assignees: Triad National Security, LLC, Los Alamos, NM (US); University of Hawaii, Manoa, Honolulu, HI (US)

( * ) Notice: Subject to any disclaimer, the term of this patent is extended or adjusted under 35 U.S.C. 154(b) by 116 days.

(21) Appl. No.: 17/118,416

(22) Filed: Dec. 10, 2020

Related U.S. Application Data

(60) Provisional application No. 62/946,395, filed on Dec. 10, 2019.

(51) Int. Cl.
*G01N 21/64* (2006.01)
*G01N 21/31* (2006.01)
*G01N 21/65* (2006.01)

(52) U.S. Cl.
CPC ......... *G01N 21/6456* (2013.01); *G01N 21/31* (2013.01); *G01N 21/6402* (2013.01);
(Continued)

(58) Field of Classification Search
CPC ............... G01N 21/6456; G01N 21/31; G01N 21/6402; G01N 21/65; G01N 2201/06113; G01N 2201/0631
See application file for complete search history.

(56) References Cited

U.S. PATENT DOCUMENTS

2010/0231722 A1\* 9/2010 Hill, Jr. ................. G01J 3/0264
348/E5.09

OTHER PUBLICATIONS

Ganguly et al., "Survival, Genetic Modification, and Time-Resolved LASER-Induced Fluorescence Analysis of Bacteria Exposed to High-Dose Radiation Simulating EUROPA'S Surface," *Europa Deep Dive 2: Composition 2018*, (LPI Contrib. No. 2100), 1 page (Oct. 10, 2018).

(Continued)

*Primary Examiner* — Kiho Kim
(74) *Attorney, Agent, or Firm* — Klarquist Sparkman, LLP

(57) ABSTRACT

Apparatus include divergence optics removably coupled to receive a probe beam in a first imaging mode to cause the probe beam to diverge before impinging on a first area of a target surface, and to not receive the probe beam in a second imaging mode to cause the probe beam to impinge on a second area of the target surface smaller than the first area, collection optics configured to receive, in response to the probe beam, luminescence light emitted from the first area and spectral light emitted from the second area, and an optical detector coupled to the collection optics, wherein the optical detector includes a luminescence imaging detector portion and a spectral imaging detector portion adjacent to the luminescence imaging detector portion, wherein the luminescence imaging detector portion is configured to receive the luminescence light emitted from the first area and the spectral imaging detector portion is configured to receive the spectral light from the second area.

20 Claims, 6 Drawing Sheets

(52) U.S. Cl.
CPC ..... *G01N 21/65* (2013.01); *G01N 2201/0631* (2013.01); *G01N 2201/06113* (2013.01)

(56) References Cited

OTHER PUBLICATIONS

Misra et al., "Standoff Biofinder for Fast, Noncontact, Nondestructive, Large-Area Detection of Biological Materials for Planetary Exploration," *Astrobiology,* 16(9):715-729 (Sep. 1, 2016).
"P52C-11: OrganiCam: A lightweight time-resolved panoramic fluorescence imager and Raman spectrometer for icy world organic detection and characterization," AGU Fall Meeting 2018, 1 page (Dec. 14, 2018).
Wiens et al., "OrganiCam: A lightweight time-resolved fluorescence (TRF) imager and Raman spectrometer for icy world organic detection and characterization," https://agu2018fallmeeting-agu-ipostersessions.com/Default.aspx?s . . . , 17 pages (Dec. 2018).

* cited by examiner

SINGLE DETECTOR LASER-INDUCED FLUORESCENCE IMAGER AND RAMAN SPECTRAL INSTRUMENT

CROSS REFERENCE TO RELATED APPLICATION

This application claims priority to U.S. Provisional Patent Application No. 62/946,395, filed Dec. 10, 2019, and is incorporated herein by reference.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The field is laser-induced luminescence imaging.

BACKGROUND

The search for life in the Solar System and understanding habitability on other planets are two of the major goals of NASA and the Astrobiology Institute. Mars and icy worlds, including Europa and Enceladus, are prime locations to search for extant life in the solar system. For example, the subsurface of Mars is a prime location to explore for evidence of life, and new missions to explore Martian caves with small rovers or drones have been envisioned. In addition, the surface and subsurface of icy moons of Jupiter and Saturn, including Europa and Enceladus, are considered locations of great interest to astrobiology. Future missions will likely explore the European surface and icy world subsurface oceans. These missions would greatly benefit from reconnaissance instruments that can guide the spacecraft and obtain or analyze samples in regions having concentrations of organic materials and possible biosignatures. To search for life on other worlds, new instruments must be developed that can detect such biosignatures. So far, undisputed biosignatures have not been discovered anywhere outside of Earth, and the lack of any clear biosignatures on Mars or ocean worlds suggests that biological materials may be rare on planetary surfaces. Moreover, difficulties persist in the development of these instruments; background signals from rocks, ice, etc., are often several orders of magnitude stronger than the signal of interest are present, and the observations are further compounded by the complexities of spaceflight and planetary science and exploration mission requirements. Thus, a need remains for improved approaches to detecting material characteristics and biosignatures.

SUMMARY

Examples of the disclosed technology include methods and devices capable of time-resolved luminescence imaging and Raman spectroscopy. Example instruments can be suitable for surveying of bio-organic matter on planetary surfaces, including Mars and icy bodies in the solar system. Specific examples are capable of ppm level detection of luminescent organics in a survey mode, and ppb level detection of luminescent organics in a targeted mode. Instrument examples are also capable of determining major mineral phases using Raman spectroscopy.

According to an aspect of the disclosed technology, apparatus include divergence optics removably coupled to receive a probe beam in a first imaging mode to cause the probe beam to diverge before impinging on a first area of a target surface, and to not receive the probe beam in a second imaging mode to cause the probe beam to impinge on a second area of the target surface smaller than the first area, collection optics configured to receive, in response to the probe beam, luminescence light emitted from the first area and spectral light emitted from the second area, and an optical detector coupled to the collection optics, wherein the optical detector includes a luminescence imaging detector portion and a spectral imaging detector portion adjacent to the luminescence imaging detector portion, wherein the luminescence imaging detector portion is configured to receive the luminescence light emitted from the first area and the spectral imaging detector portion is configured to receive the spectral light from the second area. In some examples, the divergence optics include a lens, reflector, diffuser, or a combination, wherein the divergence optics are configured to produce a conical divergence in the probe beam of at least 5°. In some examples, the divergence optics include a beam homogenizer configured to reduce a non-uniformity of the intensity distribution of the probe beam. Some examples further include an actuator coupled to the divergence optics and configured to move at least a portion of the divergence optics from a path of the probe beam so that the probe beam is directed to the target surface without being imparted with a beam divergence with the divergence optics. Some examples further include a controller coupled to the actuator and configured to control movement of the divergence optics based on an imaging mode command. In some examples, the actuator can include a lens wheel or a movement stage. In some examples, the collection optics include spectrometer optics configured to receive a portion of the luminescence light or the spectral light and to disperse and direct the portion to the spectral imaging detector portion of the optical detector. In some examples, the spectrometer optics comprise a pick-off mirror, slit, diffraction grating or grism, and one or more focusing lenses. Some examples further include a pulsed laser source configured to produce the probe beam and to direct the probe beam along a probe beam path, wherein the divergence optics are removably coupled to the probe beam path to receive the probe beam and produce the divergence in the first imaging mode. Some examples further include a pulse generator coupled to the pulsed laser source and the optical detector and configured to control the generation of pulses by the pulsed laser source, wherein the optical detector is gated in relation to a timing of the pulse generator. In some examples, the optical detector is part of a detection unit that includes a detection intensifier configured to amplify a signal of the collected luminescence light and spectral light, wherein a gate timing of the detection intensifier is determined relative to the generation of pulses. In particular examples, the pulsed laser source is configured to emit laser pulses at a wavelength between 10 nm and 10 μm. Some examples further include a standoff configured to provide a predetermined distance between the divergence optics and the target surface in the range of 10 cm to 10 m, or a high f-number, fixed focus lens configured to provide a large depth of field. In some examples, the optical detector is an intensified time-gated detector. In some examples, the optical detector comprises a CCD, EM-CCD, fast-gated CMOS, and/or APD. In some examples, the optical detector is configured to detect luminescence and/or Raman spectral signatures. Some examples further include an optical filter configured to block at least a portion of scattering probe beam light from reaching the optical detector to reduce a damage to the detector and/or reduce a saturation of the detector that would hinder detection of the luminescence light and/or spectral light. In some examples, the optical filter includes a notch filter and/or long-pass filter. Some examples can include coupling optics configured to direct the probe beam to the target along a co-boresight path of the collection optics. Further examples can include beam adjustment optics configured to receive the probe beam along the co-boresight path in the first imaging mode and to adjust a direction of the probe beam to be approximately coaxial or parallel with an optical axis of the collection optics.

According to another aspect of the disclosed technology, methods include, in a first mode configured to detect laser induced luminescence: emitting a first laser pulse, directing the first laser pulse to a target surface with a divergence in the first laser pulse so that the first laser pulse diverges before impinging on a first area of a target surface, collecting an emission from the first area caused by the first laser pulse, and detecting a first luminescence image at a luminescence imaging detector portion of an optical detector and a first spectral image at a spectral imaging detector portion adjacent to the luminescence imaging detector portion; and in a second mode configured to detect Raman emission: emitting a second laser pulse, directing the second laser pulse to the target surface without the divergence associated with the first laser pulse so that the second laser pulse impinge on a second area of the target surface smaller than the first area, collecting an emission from the second area caused by the second laser pulse, and detecting a second spectral image at the spectral imaging detector portion. In some examples, the second mode is configured to detect a luminescence emission that is weaker than the laser induced luminescence from the first mode, using the luminescence imaging detector portion.

The foregoing and other features and advantages of the disclosed technology will become more apparent from the following detailed description, which proceeds with reference to the accompanying figures.

DETAILED DESCRIPTION

Figure 1A:
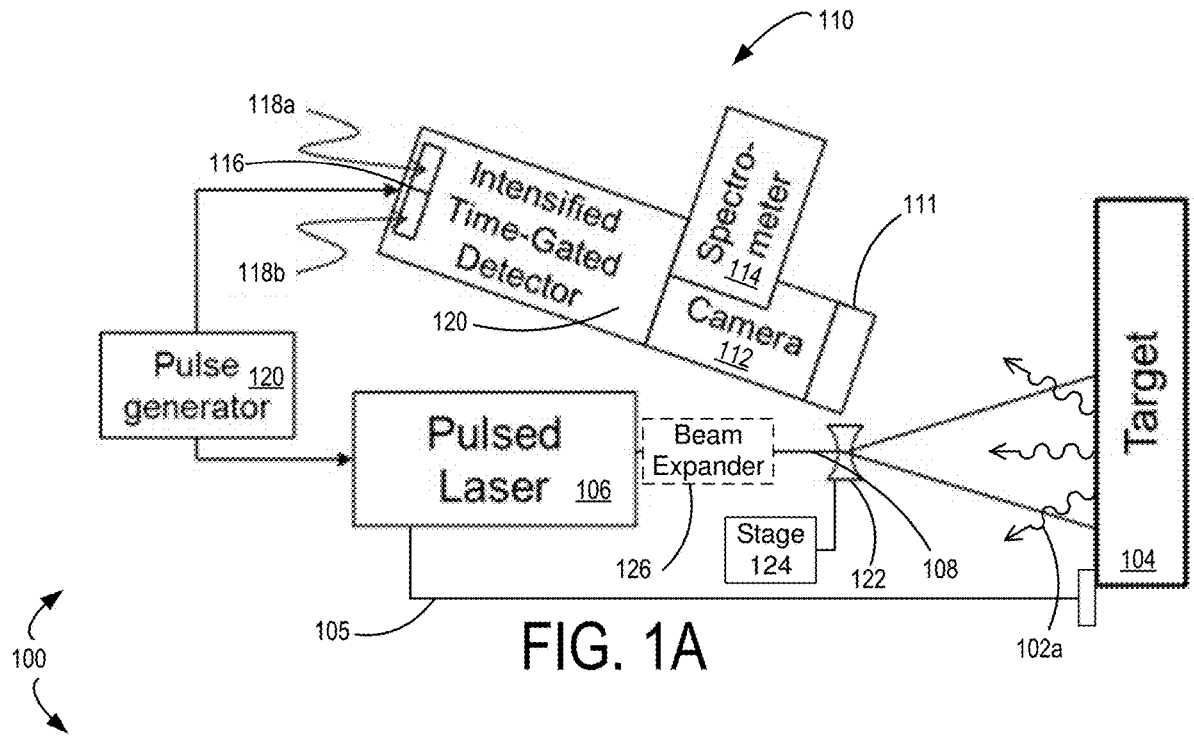
FIG. 1A shows an imaging apparatus operating in a luminescence imaging mode.

The disclosed technology includes standoff sensing instruments capable of both laser-induced luminescence imaging of a broad area and Raman spectroscopy of selected locations. Time-resolved luminescence can uniquely identify organic materials at a distance due to a significant difference in luminescence lifetimes between organic and inorganic materials. Disclosed examples include standoff laser-based instruments that can be used to survey for biosignatures on Mars or icy bodies, and characterize the biosignatures with Raman and luminescence spectroscopy.

Luminescence is based on the phenomenon of adsorption of an excitation photon, non-radiative relaxation, and emission of a photon at longer wavelengths. Minerals containing transition metal and rare-earth element (REE) ions are excited with UV and visible lasers; they produce luminescence bands that often overlap with the luminescence bands of biogenic and non-biogenic organic compounds in the wavelength domain. However, the luminescence of inorganic materials and bio-organic materials do not overlap in the time domain. The decay time, or lifetime, of biogenic compounds is much shorter (<1 to 100 ns) and the average luminescence lifetime of several bacteria has been shown to be <10 ns. The luminescence lifetime of a fluorophore in a protein or nucleic acid is highly dependent upon its local environment and can vary from a few ps to 10 s of ns. The luminescence decay time of metal ions is 1 µs to several ms in minerals. Some REEs can luminesce very quickly (10 s of ns), but they are easily identified with their sharp spectral features. Disclosed examples herein can take advantage of the generally unique short lifetime of bio-luminescence to locate biological materials among inorganic materials when excited with a suitable excitation source, such as a pulsed laser. Thus, as discussed herein, luminescence generally refers to numerous processes where light is emitted from a material in response to optical stimulation. Fluorescence is a type of luminescence having a relatively short lifetime, e.g., less than about 10 ns. Longer lifetime luminescence processes can include phosphorescence, mineral luminescence, etc. Various disclosed examples can image luminescence of various lifetimes, including shorter lifetime fluorescence. Raman light and Raman emission generally refers to light inelastically scattered by a material based on the Raman effect.

Time-resolved luminescence spectroscopy is a technique that can be used to detect luminescent materials and characterize them in both the spectral and the temporal domains. In time-resolved luminescence spectroscopy, a pulsed laser coupled with a fast detector shutter can enable the separation of luminescence signals in the time domain. Raman and laser-induced luminescence (LIL) instrumentation typically use the same excitation wavelengths, and result in emission wavelengths that cover similar wavelength ranges. Since both Raman and biological luminescence happen within the first 100 ns after a laser pulse, disclosed examples are configured to combine detection for the two techniques into a common instrument that can detect both Raman and biological luminescence.

LIL instrumentation can be most sensitive to biopolymers, especially proteins that contain aromatics, DNA and RNA (or any aromatic nucleic acids), and pigments (e.g., chlorophyll, porphyrins), which are present in both living and preserved dead cells. Most of the biogenic and organic materials we are aware of give strong luminescence signals when excited with UV and visible lasers. Microbes, such as photosynthetic and methanogenic microbes, produce unique biomolecular compounds that enable detection via native luminescence. Compounds such as chlorophyll and phycocyanins can be easily stimulated by blue light to provide red/yellow luminescence features. Polymeric biological compounds including proteins, DNA, RNA, and lipids are major components of microbes that can be useful as biomarkers. LIL spectroscopy has been used to detect bacteria, fungi, algae and phytoplankton, DNA, amino acids and proteins, aromatic hydrocarbons and organics, atmospheric naphthalene, and aqueous organic matter. LIL imaging can reveal the localization and make measurements of intercellular molecules, sometimes at the level of single-molecule detection.

Disclosed examples can meet a broad set of space exploration goals, such as Europa missions to detect indicators of life, to detect and characterize inorganic indicators of past or present life, and to characterize the composition of ice and non-ice materials. Examples can be multi-purpose instruments capable of meeting these goals. Examples instruments could also be highly useful on Earth in detecting biological materials or contamination over a broad area using laser-induced luminescence imaging, and then using Raman spectroscopy to provide much more positive identification (than merely from fluorescence) of the molecular structure of the contaminant.

Biological materials can be located by laser-induced luminescence imaging, but the exact nature of the materials remains unknown. Subsequent analysis by Raman spectroscopy can identify the molecular structure of the biological materials. The use of a single instrument to perform these two diverse types of analyses greatly simplifies the identification, especially in field work or remote areas.

Disclosed examples can be useful tools for field geology and environmental cleanup applications. Examples include geological surveys for oil, gas, and other resources, detection and remediation of organic environmental pollutants, and general geology/geobiology/environmental science research. Examples can detect organics or biological materials quickly and in small quantities, potentially making it a useful instrument for biological, chemical, explosive forensics and threat detection and environmental remediation cleanup applications. Some instrument examples can find particular application in clean-room environments, e.g., in characterizing materials with high sensitivity.

However, in extraplanetary examples, ocean worlds including Europa, Enceladus, and to a lesser extent Ceres are targets in the search for biomaterials outside of Earth, because the existence of stable, long-lived oceans and sources of energy imply a habitable environment. Characterization of the icy surfaces can be a first step in exploration of the contents of the oceans contained below. Fortunately, there is strong evidence of transport of material from the oceans to the surfaces in the form of geysers (plumes) and resurfacing along fractures. Biomaterials, if they exist in the oceans, should be evident from exploring young icy surfaces. Organic molecules and especially biosignatures tend to exhibit prompt luminescence, with lifetimes similar to fluorescence, that can be distinguished from mineral luminescence; mineral luminescence may persist for micro to milliseconds. Thus, disclosed examples can use time-resolved luminescence spectroscopy to uniquely identify organics on icy surfaces.

Disclosed examples use pulsed laser sources, which can provide superior time-resolved stimulation, and they can be synchronized with a nanosecond time gated detector to provide sufficient discrimination to distinguish organics from luminescing or fluorescing minerals. The current Mars 2020 "SuperCam" flight instrument uses a pulsed laser source to investigate luminescence in a point mode. For the ocean worlds, operations are expected to be substantially more difficult. Embodiments disclosed herein can use time-resolved luminescence panoramic imaging, which can immediately identify organic concentrations in the vicinity of a lander, such as that being considered for Europa missions. For imaging mode, a laser beam is diffused over the imaged region as demonstrated by the U. Hawaii "Biofinder" instrument. Detection of organics will be in the part per million range due to the strong luminescence response, and spatial resolution will be in the single millimeter range. As will be discussed further below, examples of the disclosed technology can also contain a spectrometer for detecting spectra of passive visible-range, and active luminescence (including fluorescence), and Raman spectra. For Raman spectra, disclosed examples remove a laser diffuser, providing sufficient stimulation for detection of weaker Raman signatures. In biosignature detection examples, the spectrometer could be calibrated with bacteria that both has and has not been exposed to radiation, such as Deinococcus radiodurans (radio-resistant) and *Escherichia coli*. For example, both damaged and un-damaged bacteria can be DNA sequenced and scanned by the instrument to calibrate for radiation-exposed biosignatures using unexposed bacteria as a control.

The article by Misra et al. entitled "'Standoff Biofinder' for Fast, Noncontact, Nondestructive, Large-Area Detection of Biological Materials for Planetary Exploration," Astrobiology, Volume 16, Number 9, 2016, is incorporated by reference herein in its entirety to the extent not inconsistent with the present disclosure.

The article brief by Ganguly et al. entitled "Survival, Genetic Modification, and Time-Resolved LASER-Induced Fluorescence Analysis of Bacteria Exposed to High-Dose Radiation Simulating EUROPA'S Surface," Europa Deep Dive 2: Composition 2018 (LPI Contrib No. 2100), is also incorporated by reference herein in its entirety to the extent not inconsistent with the present disclosure.

In various examples, detection techniques can be automatically performed through pre-programmed routines (particularly in selected extra-planetary missions), or can be switched by an operator, e.g., through local control (e.g., with the press of a button) or remote control. Examples can use a one or more lasers and a time-gated detector. In representative embodiments, both laser-induced luminescence imaging and Raman or general spectroscopy can be performed, or related data obtained, with the same instrument, rapidly and efficiently.

In an embodiment, an instrument includes a pulsed laser with a dispersed beam covering an area defined by a conic section of angle >5°, and collection optics (e.g., a camera) that can focus a substantial portion of received light to a detector, such as a time-gated intensified detector (see e.g., FIGS. 1A-1B), so as to produce a luminescence image. The detector can have a time gate (intensifier ON-OFF time) of <500 ns to separate prompt and delayed fluorescence and to separate Raman signals from delayed fluorescence. A notch or long-pass optical filter can be used to block scattered laser light from entering the detector. In some examples, a portion of the incoming light is redirected through a slit or other optics and into a spectrometer. The spectrometer can redirect the dispersed light onto a portion of the detector that is not used for direct imaging. Thus, examples of the disclosed technology can improve upon previous fluorescence imagers by adding a spectrometer that collects a spectrum and detects the collected spectrum on the same detector. In representative embodiments, a mechanism is provided to switch between a dispersed beam generated in first mode, referred to as an imaging mode in some examples, and a non-dispersed beam such as a collimated beam, e.g., for sensitive Raman interrogation of a specific spot on the target in a second mode, which can be referred to as a targeted mode in some examples. In the imaging mode, for example, a laser-induced luminescence image can be collected on a first portion of the detector, and a luminescence spectrum can be collected on the other portion of the detector. In targeted mode, a diverging lens can be removed from the laser beam path, and a collimated beam can be produced, enabling the collection of a sensitive Raman spectrum providing molecular vibrational information about the target. Because Raman response is generally more than 1000× weaker than luminescence emissions for a given laser irradiance, the non-diverging beam (e.g., collimated laser beam) can specifically enhance or make practical Raman spectroscopy, while a diverging laser beam can suffice for luminescence emissions, which can then be imaged. Representative embodiments use a single detector and have the ability to switch between luminescence imaging and targeted Raman modes. The single detector can allow instrument examples to be extremely compact and low power, which can be useful in space missions or in other portable applications.

In various instrument examples used to discover biosignatures, low detection limits in the part per million (ppm) to part per billion (ppb) range, or even lower, can be provided. Background materials may include organic materials that are non-biological in origin. Background materials on icy surfaces (besides the ice itself) include meteoritic contamination, consisting of mineral assemblies and small amounts of organic materials of non-biological origins, potentially including amino acids, and insoluble organic materials (i.e., macromolecular carbon). Rocky planets have mainly mineral backgrounds, although small amounts of organic materials of non-biological origin are present within the rocks. Also, long term radiation of the surface causes decomposition of the organics—both abiotic and biogenic, if present—increasing the difficulty of understanding signals collected on these surfaces. On Mars, recent results from the NASA Curiosity rover report that the total amount of organic carbon in drilled samples is 10 to 100 nmol of C, ~70 ppb of Cl-aliphatics, and 150-300 ppb of chlorobenzenes were detected within bulk rock. Thus, suitable detection limits in instrument examples that can be used to survey for organics on Mars have limits of 50 ppb or lower.

Disclosed examples can also provide improved detection capability with high spatial resolution cameras, e.g., with at least 1 mm spatial resolution. For example, spatial resolution at 1 mm can be required for imaging terrestrial microbial mats with 2 mm spaced laminations. In some instrument examples, a camera is positioned at stand-off distances, e.g., on a movable mast, which can provide advantages over an arm-mounted camera in terms ease of use. Example instrument cameras can be mounted on a mast from which panoramic images of a planetary surface can be obtained. In some examples, camera can be mounted on a mobile vehicle, such as a rover or airborne vehicle. Selected examples have cameras providing a 1 mm spatial resolution from at least two meters away. Other spatial resolutions and distances are possible.

Referring again to FIGS. 1A-1B, there is shown an example of a luminescence detection instrument 100 configured to detect light emission 102a, 102b from a target 104. Representative examples of the instrument 100 can be used in an extra-planetary environment to detect light emission from various surfaces, though examples can be used in various applications on Earth as well. In an example, the instrument 100 can be used as a time-resolved LIL imager and Raman spectroscopy instrument. In disclosed examples, the instrument 100 includes pulsed laser source 106 configured to generate laser pulses 108 that can be directed to the target 104 to generate the light emission 102a, 102b. Example of the pulsed laser source 106 can include a semiconductor laser, gain-switched laser, q-switched laser, fiber laser, mode-locked laser, laser amplifier, etc. In a particular example, the pulsed laser source 106 is a 20 Hz 532 nm pulsed laser (Quantel Q-smart 450).

The instrument 100 also includes a detection system 110 that includes collection optics 112 such as a camera or objective situated to receive the light emission 102a, 102b emitted from the target 104. Representative examples include spectrometer optics 114 configured to direct a portion of the received light emission 102a, 102b and to spread the light spatially based on wavelength. An optical detector 116 includes two adjacent portions 118a, 118b configured to detect the light emission 102a, 102b, with the portion 118a detecting light received with the collection optics 112 and not directed to the spectrometer optics 114 and with portion 118b detecting light spectrally spread by the spectrometer optics 114. In many examples, the detection system 110 can also include an intensifier 120 situated to amplify collected light before it is received by one or both portions of the optical detector 116. In some examples, the intensifier 120 and optical detector 116 can form a unit referred to as an intensified charge-coupled device (ICCD) detector. The instrument 100 also includes a pulse generator 120 configured to produce a timing signal for the pulsed laser source 106. Example pulse generators include commercially available pulse generators, such as ones made by DEI. The timing signal from the pulse generator 120 can also be used to synchronize the timing of the generated laser pulses 108 with various components, such as the intensifier 120 and optical detector 116. For examples, synchronizations can include predetermined or adaptive delays or advances so that emission of the laser pulses 108, gating of the intensifier 120, and gating of the detector 116 can be timed relative to each other for improved detection capability. Various types of the optical detector 116 may be used, e.g., CCDs, EM-CCDs, CMOSs (including fast-gated CMOSs), APDs, SPADs, scintillators, etc.

In representative examples, the instrument 100 includes divergence optics 122 situated to receive the laser pulses 108 and to diverge the laser pulses 108 so that the laser pulses 108 extend across a larger area at the target 104. FIG. 1A shows an arrangement in which the instrument 100 operates in a first mode where the laser pulses 108 are directed through the divergence optics 122 before impinging the target 104. The divergence optics 122 can include one or more lenses that impart a divergence to the laser pulses 108, such as plano-concave lens, concave-concave lens (e.g., similar in shape to the divergent lens shown in FIG. 1A). The divergence optics 122 can also include a diffuser instead of or in addition to one or more lenses. In some examples the divergence optics 122 include a divergent micro-lens array diffuser. In particular examples, the divergence optics 122 can include a single micro-lens array diffuser without other divergence optics, allowing for a compact arrangement. Some examples include "Engineered Diffusers" made by RPC Photonics. Example diffusers can also provide intensity homogenization, e.g., changing a beam with a Gaussian or other intensity distribution into a more uniform intensity distribution for uniform illumination of the surface of the target 104 with the laser pulses 108. In further examples, a separate homogenization component can be provided to homogenize intensity, e.g., with a light pipe. Divergence and homogenization can provide distributions that match, align, or better fit detection system geometries, such as CCDs, lens, and fields of view. Divergence optics 122 can also include optics that converge or focus the laser pulses 108 between the target 104 and the divergence optics 122 causing the optical pulses 108 to expand after the focus.

As shown in FIG. 1A, in the first mode, the laser pulses 108 pass through the divergence optics 122 to illuminate a large area of the target 104 in front of the collection optics 112, e.g., at a standoff distance of 1-5 m with a standoff 105, to excite LIL at the target 104. In some examples, instead of or in addition to the standoff 105, the instrument 100 can include a high f-number, fixed focus lens configured to provide a large depth of field such that the viewed scene is approximately in focus beyond a certain minimum distance, e.g., 5 cm, 10 cm, 1 m, 2 m, 5 m, etc. The LIL across the large area allows some of the light 102*a* to be received by the collection optics 112 so that an image of the LIL can be formed with the detector portion 118*a*. The detection system 110 can also include a long-pass filter 111 in some examples, which removes Rayleigh-scattered laser light. Some of the light 102*a* incident on the collection optics 112 can be received by the intensifier 120 and directed to the detector portion 118*a*, while a small portion of the light 102*a* can be directed into the spectrometer optics 114 (and optionally through the intensifier 120) and to the detector portion 118*b* to produce a spectrum. The spectrum and the image can be recorded simultaneously by the optical detector 116, which reduces mass, volume, and power of the instrument 100.

Figure 1B:
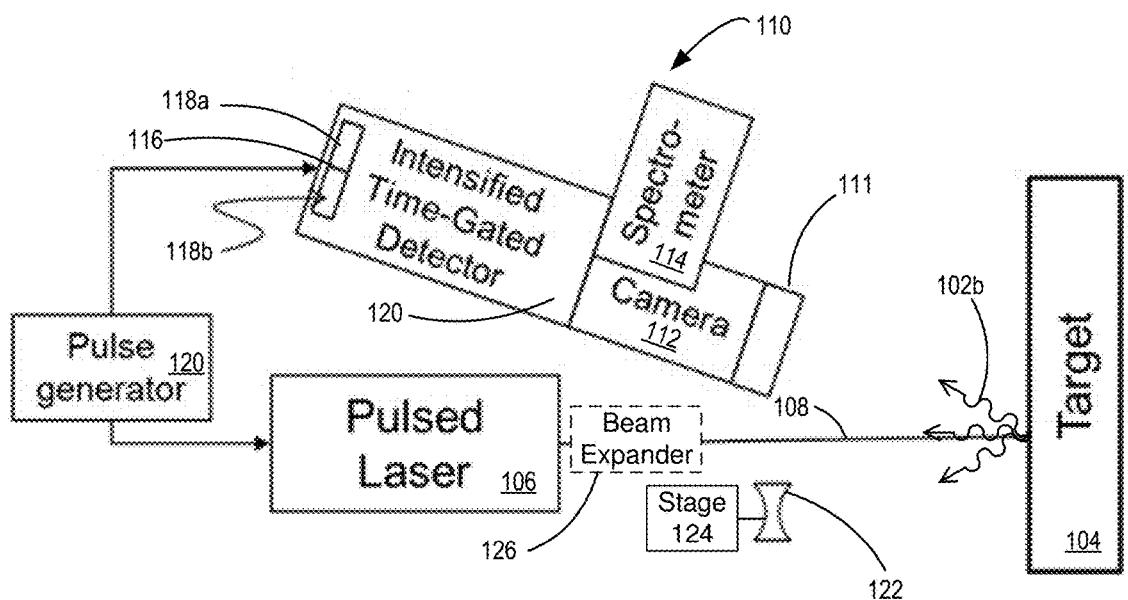
FIG. 1B shows the imaging apparatus of FIG. 1A operating in a Raman targeted mode.

One or more components of the divergence optics 122, such as a laser-beam diffuser, can be mounted to a motorized stage 124, which allows the divergence optics 122 to be removably coupled to the optical pulses 108. As shown in FIG. 1B, in a second mode the divergence optics 122 are removed from the optical path of the laser pulses 108 so that the laser pulses 108, e.g., in the form of a collimated beam can propagate to the target 104. The collimated beam can have a power density several orders of magnitude stronger than the diverged beam from the first mode, thereby increasing the irradiance received by the target 104 in a corresponding smaller area relative to the diverged area produced with the first mode. The larger irradiance facilitates the recording of Raman and low-detection-limit LIL spectra over the smaller area. The range in which the second mode operates can be more limited based on the smaller area. Narrower ranges for operation the second mode can include predetermined standoff distances, e.g., at 2 m. Ranges can be determined by angles between the collection optics 112 and the laser pulses 108, size of the beam at the target 104 in the second mode. In some examples, the laser pulses 108 can be aimed or adjusted for different standoff distances, e.g, by changing an aiming direction of the pulsed laser 106 and/or an orientation or position of the divergence optics 122 (e.g., through rotation and/or translation) or collimated beam size (e.g., with a beam expander 126 or other adjustable lens system). Various pulse durations for the laser pulses 108 may be used, and in some examples pulse durations can be selectably varied. Example pulse durations can include less than about 10 ps, 100 ps, 1 ns, 10 ns, or 100 ns.

Figure 2A:
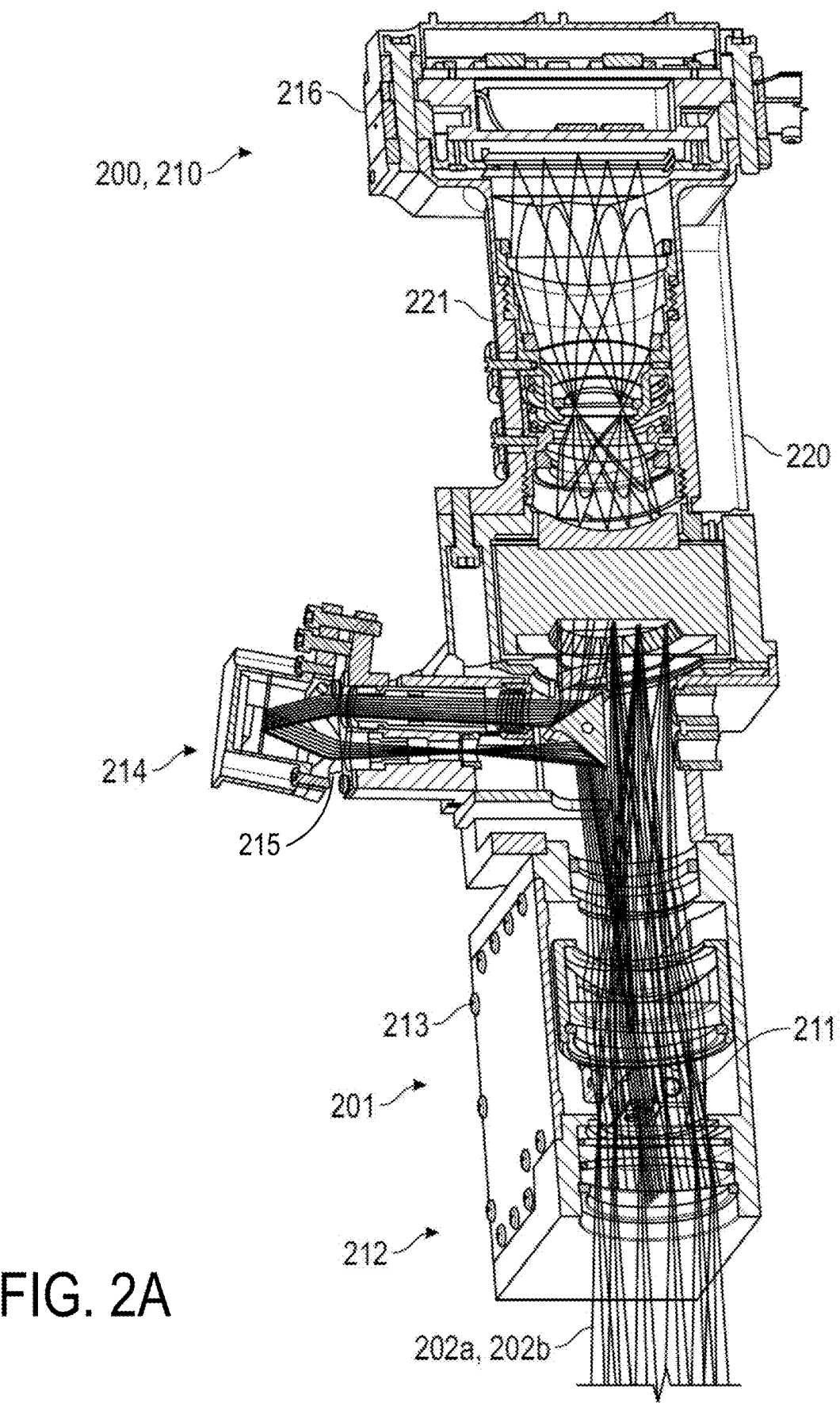
FIG. 2A is a perspective cross-sectional view of an example detection system.
Figure 2B:
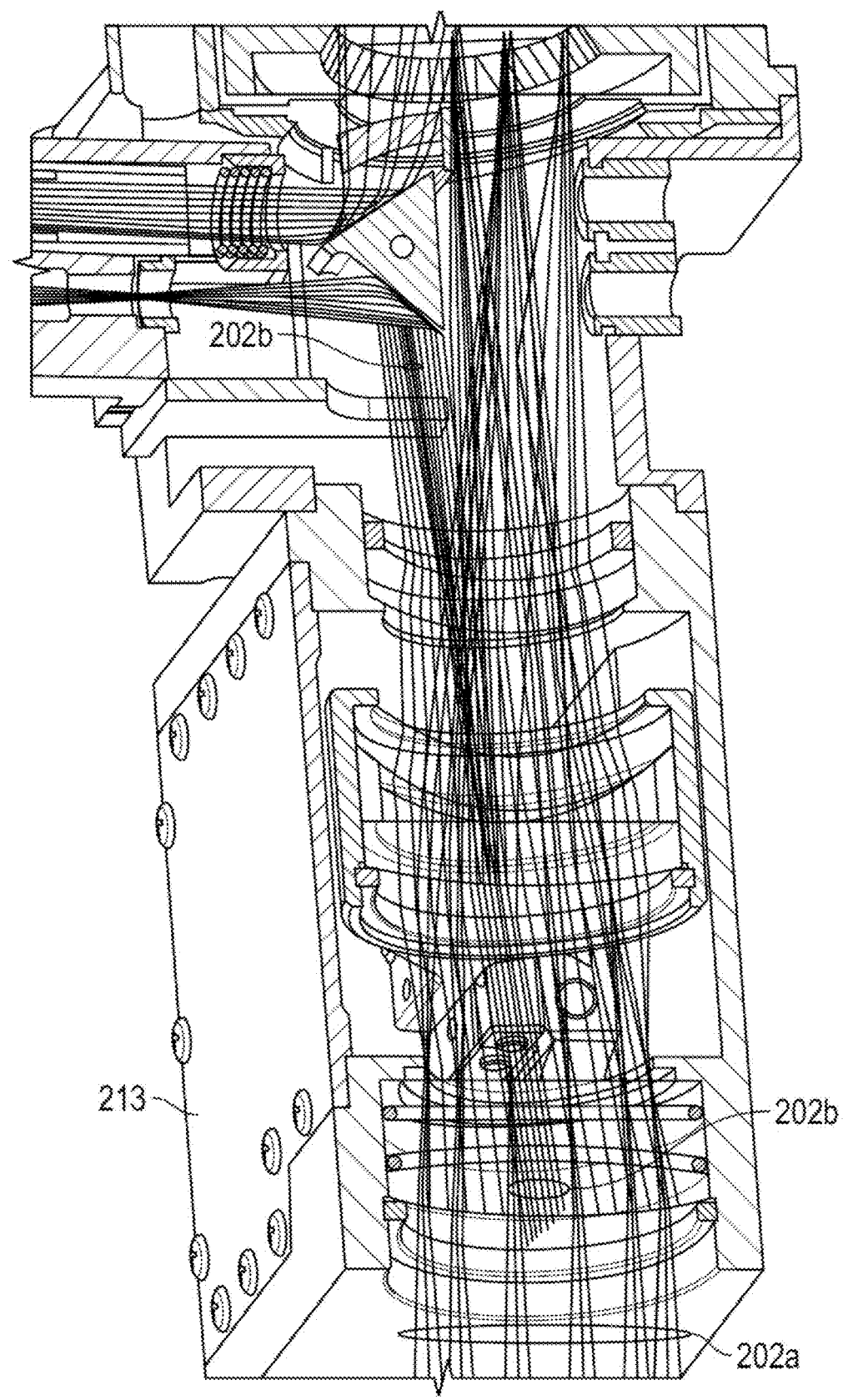
FIG. 2B is a close-up of the perspective view of FIG. 2A.

An example instrument 200 is shown in FIGS. 2A-2B with similarities to the instrument 100, with similar numbers to indicate related components. The instrument 200 includes a front-end unit 201 configured to collect LIL and Raman light and was designed using ray tracing software (Zemax OpticStudio 14). Example parameters for the objective of collection optics 212 included an 80 mm focal length, f/4.8, 12° FOV lens arrangement. FIG. 2A shows a cut-away CAD drawing of a detection system 210, including the collection optics 212. FIG. 2B shows a closer view of an objective lens assembly 213 of the collection optics 212 receiving light 202*a*, 202*b* in a first mode and second mode. In some examples, the objective lens assembly 213 (as well as other optical components) can use radiation-hardened lenses (e.g., sufficient to survive a Europa Lander mission of 2 Mrad total dose).

In a particular example, the front-end unit 201 includes the objective lens assembly 213 which can include 5 spherical lenses, and includes spectrometer optics 214 which can include a spectrometer assembly 215 having 2 mirrors, 4 spherical lenses, a 50 micron slit, a grism, and 1 cylindrical off-axis lens. The front-end unit 201 mates to an intensifier assembly 220, relay optics assembly 221, and a CCD assembly 216. In operation, the instrument 200 uses the objective assembly 213 to focus light 202*a*, 202*b* simultaneously onto an intensifier image plane and a slit of the spectrometer optics 214 using a focus stage 211 (e.g., Physik Instrumente Q-521 linear positioning stage). In typical examples, the focus stage 211 can be vacuum-rated. In some examples, the instrument 200 can be configured to focus in a range from about 1-5 m. In some examples, the objective assembly 213 can focus to infinity so that one or more other light sources can be used for long distance measurements (e.g., sunlight illumination for passive imaging and reflectance spectra). In some examples, a 532 nm long-pass edge filter (Semrock) blocks Rayleigh scattered light to the 10-6 level after the second lens in the objective assembly 213.

In representative examples, the spectrometer optics 214 can include a first arm that collimates the light from the 50 micron slit, which is then diffracted through a grism with a 600 lines/mm, 500 nm blaze wavelength grating (Opco Laboratories). The spectrometer optics 214 can include a second arm that refocuses the light back onto a receiving end of the intensifier assembly 220. Operation in the first and second modes (e.g., a survey mode and a targeted mode) can share the same optics of the front end unit 201.

In some examples, the intensifier assembly 220, relay optics assembly 221, and CCD assembly 216 can be an ICCD detector unit that has direct flight heritage from the transmission spectrometer of the SuperCam instrument suite for the Mars 2020 rover. In some examples, the intensifier assembly 220 can correspond to commercially available night-vision goggle (e.g., Elbit systems) intensifiers and modified for use in space. In some examples, detection units can include an intensifier, relay optics, CCD, and electronics. Example intensifiers can have an 18 mm diameter focal plane where light is received for amplification. The ICCD detector unit can have a resolution of ≥64 lp/mm and an adjustable gain range of 100-40,000+, and a quantum gain above 35,000 from 500 to 800 nm. Example rise times can be <20 ns, with exposure delay and duration adjustable at 10 ns increments up to hundreds of ms. Rise times and exposure delays and generated laser pulses used for probing target surfaces can be timed in relation to each other. In selected examples, the CCD assembly 216 can include a 42-10 (Teledyne e2v) 4:1 rectangular aspect ratio CCD.

In representative examples, the intensifier of the intensifier assembly 220 is powered by an ultra-compact (4.6× 12.2×3.4 cm) high-voltage power supply (HVPS). Both the HVPS and intensifier can be qualified for extra-planetary environments, such as Mars, Europa, etc. The HVPS can be situated adjacent to the ICCD detector unit and can provide the three voltages and a ground connection needed for the cathode (adjustable 0-600 V), micro-channel plate, and phosphor screen of the intensifier. The power circuit for the intensifier can include an ultra-fast switching component for the cathode that provides the gate. For example, the gating can be used to improve signal strength for organic and biosignature signals, which have relatively fast lifetimes, by controlling the timing and duration of detection exposure to reduce an amount of mineral luminescence, which has a longer and/or delayed lifetime, that is detected.

In some examples, the relay optics assembly 221 can include four sets of lenses that focus the intensified light onto the CCD of the CCD assembly 216. The relay optics assembly 221 can be situated to magnify the intensified image by an amount, e.g., 1.3×, to maximize an image area on the CCD. In some examples, the relay optics assembly 221 has a field stop at f/2.9 that can be opened further if needed. The relay optics assembly 221 can be optimized for the main phosphor green band, eliminating side bands. In some examples, the ICCDs can be fiber-coupled from the intensifier to the CCD. However, by configuring the relay optics assembly 221 without fiber-coupling, the lens system can be more rugged and lightweight, eliminating the need to epoxy a large mass of glass between fragile elements.

FIG. 2B shows a closer view of the objective assembly 213 during operation. In a first mode directed towards imaging LIL, emitted light 202a is received from a large area of a target surface and directed through the detection system 210 to imaging and spectrum portions of the CCD of the CCD assembly 216. In a second mode directed towards detecting Raman or other low strength luminescence, emitted light 202b received from a smaller emission area of the target surface is directed through the detection system 210 to imaging and spectrum portions of the CCD of the CCD assembly 216. In the second mode, the emission area is situated relative to the aperture of the objective assembly 213 and a pickoff of the spectrometer assembly 215 to improve strength of the collected spectrum light detected by the CCD assembly 216.

The instrument 200 can include mounts to couple the instrument 200 to a exploration device, such as a rover or drone. In some examples, optical mounts and adjustment features can be rapidly produced through a metal prototyping machine shop, can be configured withstand the environments of shock, vibration, and changing thermal environments. In some examples, parts can be machined through a CNC machine. Suitable build materials can include common materials such as aluminum. In an example, a detection unit weighs 692 g and can rely on support electronics for power, command, and data handling, increasing weight to approximately 2 kg in a flight configuration. Example ICCDs used, including optics, intensifier, and CCD assemblies, can weight a combined 133 g and are approximately 100.6 mm×60.45 mm×58.42 mm (L,H,W). In some examples, the spectrometer assembly 215 can be made primarily of black anodized aluminum with uncoated stainless steel optical mounts, and can contain focusing screws to steer two focusing mirrors, a mechanical flexure for alignment of the grism, and a single focusing barrel. In an example, the spectrometer assembly 215 weighed 205 g fully assembled and measures 31.88 mm×90.42 mm×58.42 mm (L,H,W). The collection optics 212, which can define a single optical axis, can be focused with the focusing stage 211, which can be a piezoelectric stage in some examples. In an example, the collection optics 212 weighed 206 g, measures 57.79 mm×57.15 mm×44.45 mm (L,H,W) of black anodized aluminum and can sustain significant mass and size reduction. Various subassemblies of the instrument 200 can be configured to be modular and replaceable, e.g, with high repeatability and consistent optical alignment over mass and size minimization. For example, the dimensions can reflect large mounting flanges (e.g., 44.45 mm and 58.42 mm wide compared to 31.50 mm and 29.46 mm width of the optical housing) that can drive the overall assembly dimensions. Internal housings can include precise optical mounting and alignment features. For example, some components can be configured to be compatible with commercial components (such as standard 1" retaining rings), though reductions in size and weight can be obtained while increasing optical stability and precision with future iterations that do not use commercial standards. In representative examples, the optical components are largely cylindrical, reside within circumferential mounts, and are held in axial compression such that temperature fluctuations do not induce misalignment and the glass can remain protected from catastrophic failure modes. Examples shown generally have a reduced number of components and optical alignment features to reduce tolerance stack-up and increase reliability in the flight environment. Internal subassemblies can also be configured for increased modularity and serviceability such that subassemblies can be focused, replaced, and maintained without affecting the overall instrument. In representative examples, light-tight covers can be removed and alignment features can have external adjustment and locking access such that optical pathways and focus stage operation can be observed while the instrument is in use.

As discussed above, representative examples use an intensifier and relay optics that transfer an image from the intensifier to a CCD imaging unit. The CCD imaging unit can include a small electronics board with an analog-to-digital converter. Divergence optics that include one or more diffusers can be configured to produce a uniform diffuse laser spot at the target. Uniform illumination can used to provide superior imaging performance by allowing comparison between relative concentrations of luminescent materials within the image.

Figure 3:
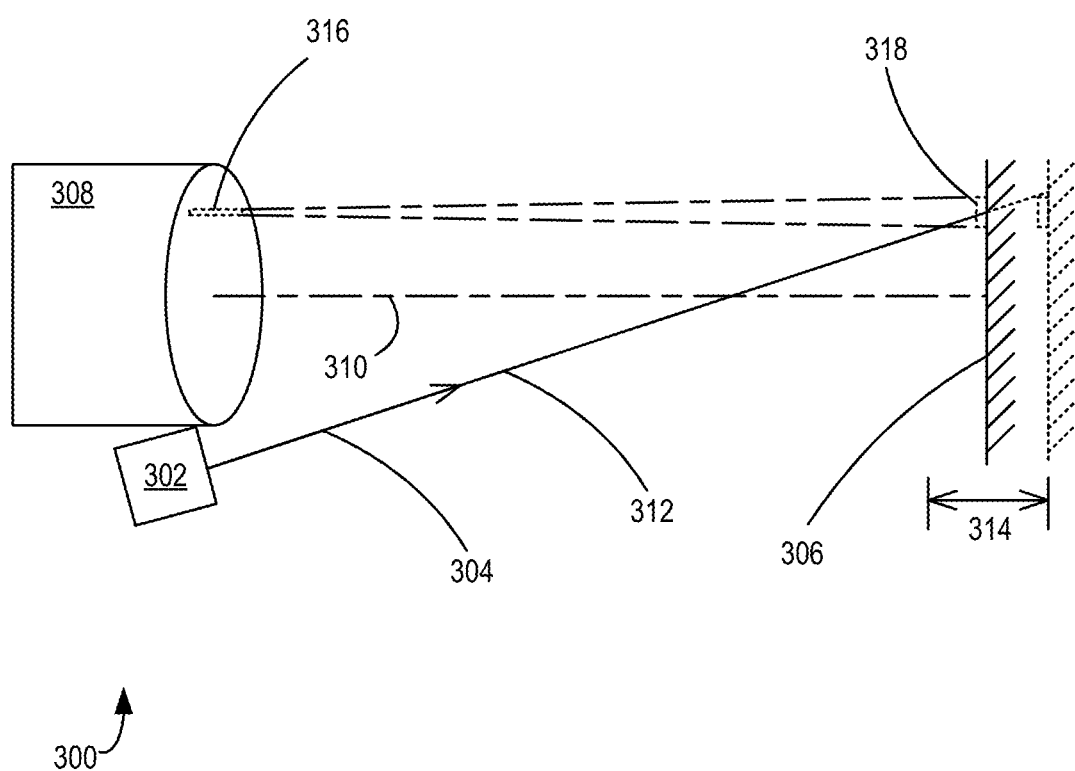
FIG. 3 is a schematic showing operation of an example imaging apparatus.

FIG. 3 shows another example instrument 300 capable of operating in a diffuse/divergent and targeted modes. A pulsed laser source 302 directs laser pulses 304 to a target 306. A detection unit 308 is configured to receive light emitted from the target 306, e.g., through luminescence caused by the laser pulses 304, and its orientation and internal optics defines an angle difference between an optical axis 310 of the detection unit 308 and an optical axis 312 of the directed laser pulses 304. If the laser beam and the sensor are not co-boresighted, a parallax effect between the outgoing laser beam pulses and the field of view of the sensor head can be associated with the angle difference. During operation in a targeted mode, e.g., with the collimated beam that does not include a specifically introduced divergence, this parallax effect can set an optimal distance to the target 306 for detection, e.g., 1 m, 2 m, 3 m, 5 m, etc. The parallax effect and related instrument parameters can determine a range of operation 314, e.g., 10 cm, 20 cm, 50 cm, etc. The detection unit 308 typically includes a spectrometer with a slit, e.g., similar to the spectrometer 114 or spectrometer assembly 215, projected on an input of the detection unit 308 as a dashed rectangle 316, such that a portion of the light emitted from the target 306 is directed through the slit so that spectral contents can be measured. At the target surface, the projected slit representation expands to be a somewhat larger dashed rectangle 318 (e.g., a slit height 50 µm can result in a projected slit height of about 1 mm at the target), centered on the intersection of the laser pulses 304 at the target 306, and representing an area in which a maximum signal strength in a targeted mode can be achieved. As the distance to the target 306 changes, if the laser and sensor are not co-boresighted, the intersection can move out of the projection of the slit, resulting in a decrease in targeted mode signal strength. Thus, in targeted modes of operation, a collimated laser beam can be directed to coincide with the center of the spectrometer's slit projected on the ground at predetermined distance. Use of a collimated or focused beam can produce an emission with ~6400× higher sensitivity as compared with a diffuse spot in a survey mode, permitting sensitive Raman spectral analysis of small features.

Figure 5A:
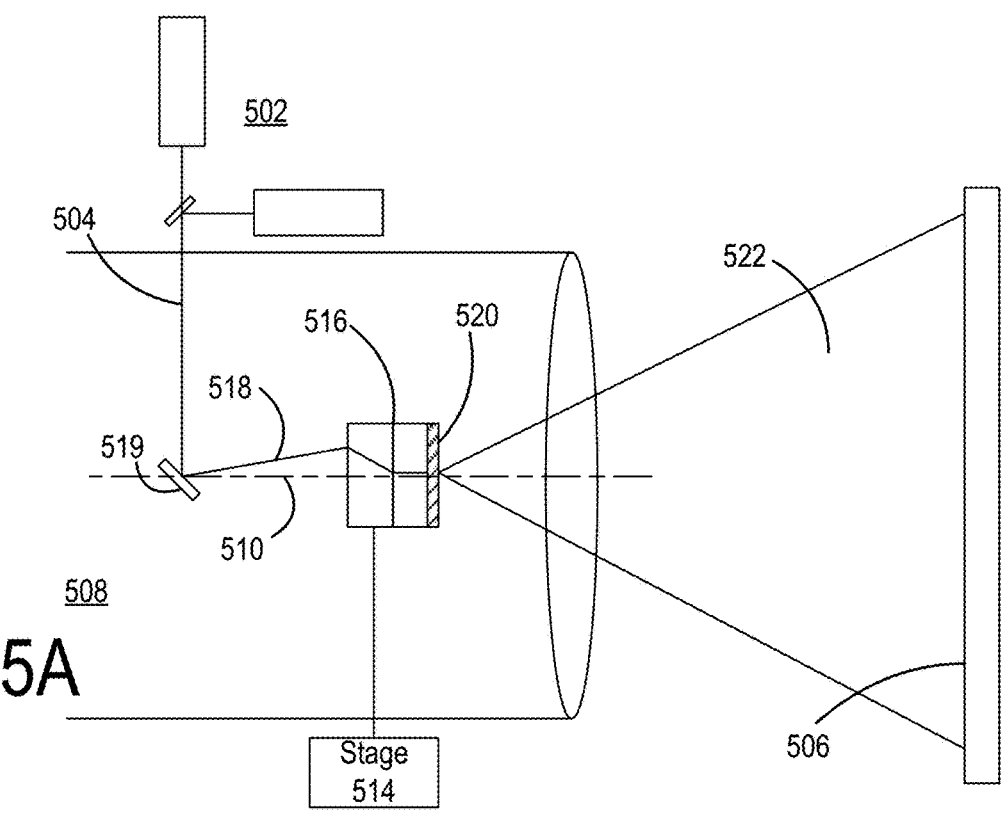
FIGS. 5A-5B show schematic portions of another example imaging apparatus in two different modes of operation.
Figure 5B:
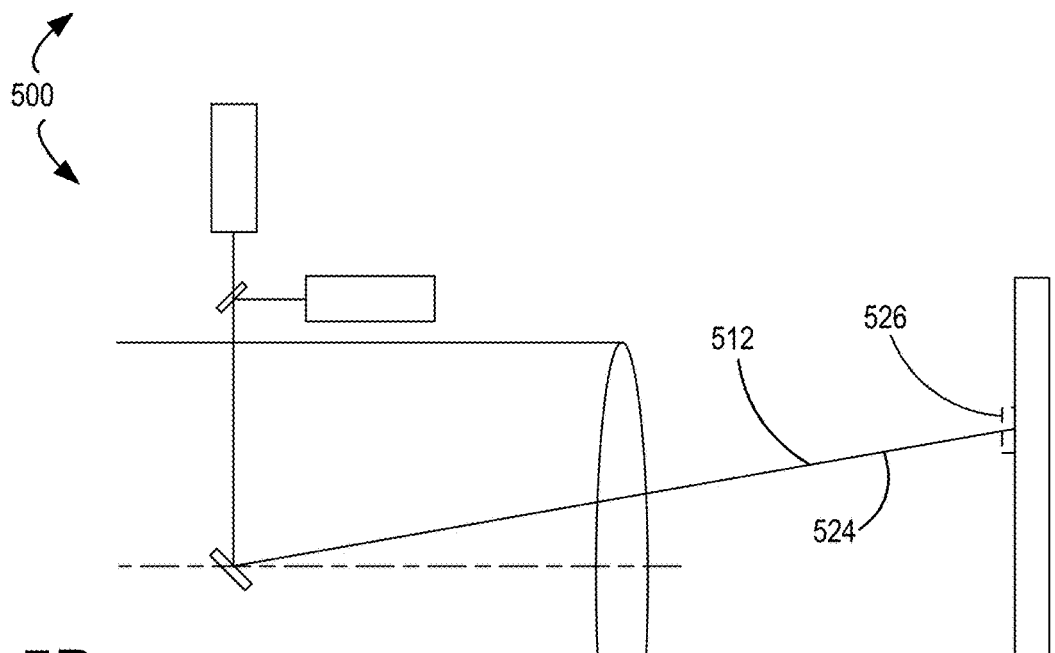

FIGS. 5A-5B show an example portion of an instrument 500, similar to the instrument 300 in some respects, but with laser beam and sensor co-boresighting. For example, a pulsed laser source 502 directs laser pulses 504 to a target 506 in a survey mode (FIG. 5A) and a targeted mode (FIG. 5B). A detection unit 508 is configured to receive light emitted from the target 506 through luminescence caused by the laser pulses 504, its orientation and internal optics defines an angle difference between an optical axis 510 of the detection unit 508 and an optical axis 512 of the directed laser pulses 504. A stage 514 can be situated to position beam adjustment optics 516, such as a refractive jog prism or other optic configured to adjust beam direction, in the path of the laser pulses 504 directed along a co-boresighted path 518 (e.g., using mirror 519) of the laser pulses 504 in the detection unit 508. In some examples, beam divergence optics 520, such as a diffuser or microlens array can be coupled to the beam adjustment optics 516 so that the divergence optics 520 are moved into position to receive the laser pulses 504 with an adjusted direction, e.g., approximately coaxial or parallel with the optical axis 510 of the detection unit 508 (within 0°, 0.5°, 1°, 2°, etc.), to produce a divergent beam 522 in the survey mode. The stage 514 can position the beam adjustment optics 516 and divergence optics 520 in a side position in a targeted mode so that a less divergent beam 524 propagates to the target and can be aligned with a slit projection 526 of a spectrometer of the detection unit 508 at a predetermined distance or range of distance relative to the detection unit 508. In some examples, the co-boresighted path 518 can be coaxial or parallel with the axis 510 after reflection by the mirror 519. For example, the stage 514 or a separate stage can be configured to direct beam adjustment optics to change the direction of the laser pulses 504 to produce the angle of the axis 512 relative to the axis 510. In such cases, the beam adjustment optics 516 may not be needed to adjust beam position and/or direction for operation in the survey mode.

Figure 4A:
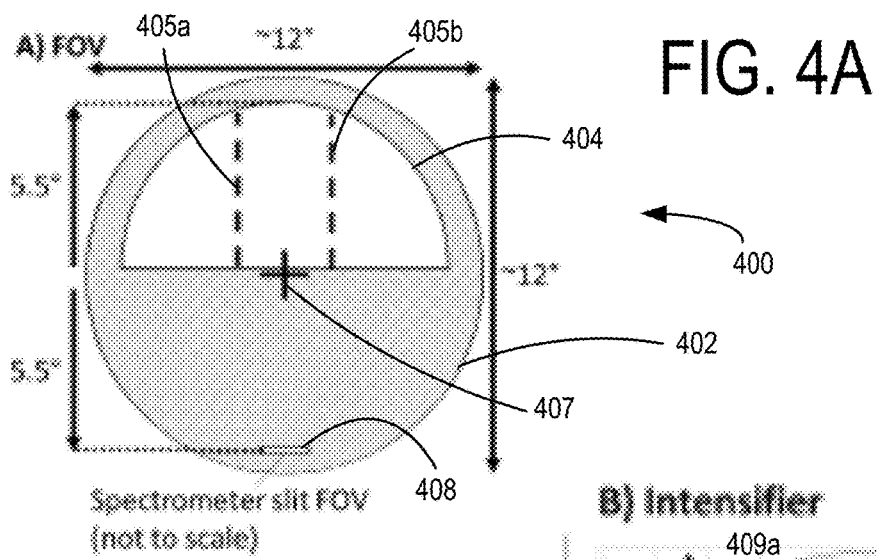
FIGS. 4A-4C show cross-sectional end views of FOV and imaging planes.
Figure 4B:
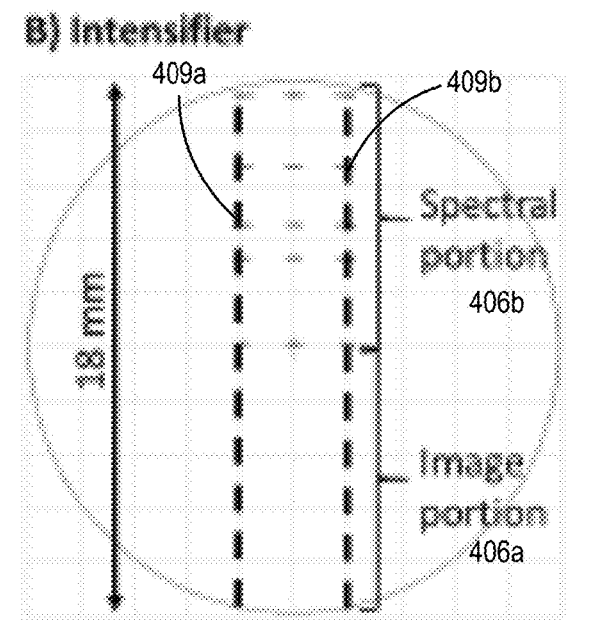
Figure 4C:
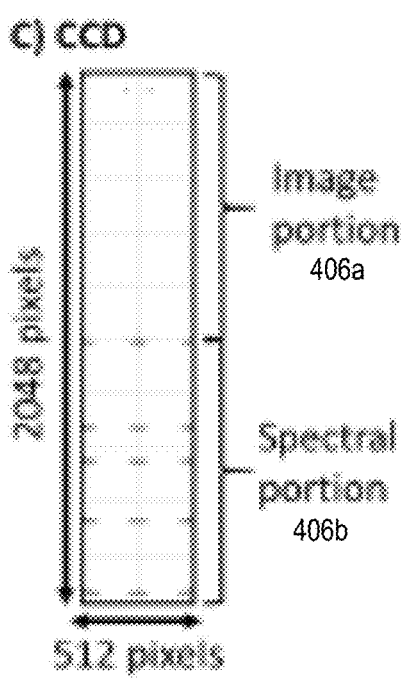

With additional reference to FIGS. 4A-4C, an example field of view 400 in angle-space is shown for a detection unit, such as the detection system 110, 210 or detection unit 300. For example, in a survey mode, divergence optics such as a laser diffuser can expand laser pulses, e.g., to a ~12° cone 402 (~1400 cm$^2$ at 2 m distance) shown in FIG. 4A. Luminescent material in the illuminated area of the target emits light that is collected by front-end optics of the detection unit from within a hemispherical region 404. Dashed vertical lines 405a, 405b represent the boundary of an imaging area with an E2V 42-10 CCD used in an example. The cross hairs 407 can correspond to a center of an optical axis of the detection unit. As shown in FIG. 4B, a bottom portion 406a of an intensifier collects light from the luminescence image and a top portion 406b records the LIL spectra. Dashed vertical lines 409a, 409b represent the footprint of the 42-10 CCD onto the intensifier image plane. FIG. 2A shows an example light path through the imaging and grism spectrometer optics that can produce the splitting of detection shown in FIGS. 4A-4C. For example, a pick-off mirror can redirect light from 5.5 degrees off axis into the spectrometer, as shown with slit field of view 408. The spectrometer optics can disperse the light and then refocus the light onto the spectral portion 406b of a CCD. In representative examples, the spectrometer provides a linearly arranged spectrum (e.g., vertically oriented) on the intensifier and CCD. The optics of the detection unit can invert the image and spectrum once for the image on the intensifier plane in FIG. 4B and again when focused onto the CCD image plane in FIG. 4C. Thus, in some examples, the CCD captures a spectrum on a bottom half and an image on a top half. The CCD can have a 4:1 rectangular aspect ratio, though other aspect ratios or shapes are possible, including square, circular, etc.

Various materials can be used to calibrate instrument examples for detection of Raman wavelengths. For example, rhombohedral calcite can be used as it is a pure mineral lacking in organic luminescence, but at least in some cases includes a Mn3+ impurity providing strong broad long lifetime mineral luminescence. Leaf chlorophyll can provide broad luminescence spectra and can be compared to egg shells to yield distinctly different spectral features. Basaltic rock can be a suitable substitute for Mars-like material and should lack luminescence. Calibration for other planetary bodies can be adjusted according to probable compositions. Timing and gating of instrument pulses, intensifiers, and CCDs can be adjusted to correspond to calibrated materials to verify exclusion of spurious signals. Gypsum nodules can be used as a material providing a suitable unknown sample as it can have organics and should provide suitably intense Raman peaks. Instrument detection limits can be determined with fluorescent dyes selected based on the pulsed laser source wavelength or wavelengths and diluted to various predetermined ppm levels, such as 5, 10, 20, 50, 100 ppm levels etc.

Detection ranges for luminescence and Raman spectral data can vary. In a particular example, a wavelength range from 540-673 nm (~280-4000 cm−1) is provided, with a ~175 cm−1 full width half maximum spectral resolution. In this spectral range and with this resolution, major inorganic and organic features can be discerned (e.g., differences between water ice and C—H organic stretching bands, major mineral groups such as carbonates, phosphates, sulfates, and other salts) with Raman spectroscopy. LIL spectra can also help in identification of the class of organic molecule that is fluorescing in the laser spot. Further, if ice is present in a target sampling area, the laser pulses can penetrate the ice to a depth, e.g., by a few cm (depending on attenuating materials embedded in the ice) to allow detection of materials within ice.

In an example, instrument detection limits were modeled based on the solid angle of the instrument collection optics, the % transmission of the optics (which take into account the transmission of the glasses and anti-reflective coatings), and using a diffuse laser spot having a pulse power of 12 mJ, for a 1 mm size luminescence emitter with quantum efficiency of 25% at 2 m distance. The detection limit assumes the intensifier requires 10 photons per pixel to detect a signal. An imaging mode typically requires relative darkness to avoid background photons, e.g., for best detection limits. In full sunlight on the martian surface, dark targets contribute <10 solar photons to each imager pixel, but bright ones yield more than 100, so twilight or night-time operation is typically required. Underground operation, e.g., in a Mars cave, is not restricted by sunlight. Instrument applications on Europa and Enceladus have less of an issue due to further distances from the Sun; the average solar irradiance at Mars is 586 W/m$^2$, compared to that of Jupiter (50 W/m$^2$) and Saturn (14.8 W/m$^2$). For luminescence imaging and spectroscopy, using the above assumptions, a 10 ppm single shot detection limit from a 2 m distance can be achieved. For luminescence spectroscopy in targeted mode, instrument single shot detection limits can be around ~10 ppb. For Raman spectroscopy in targeted mode, a similar optical model can be used and a conservative Raman cross section of $10^{-8}$ for a spectrally narrow Raman emission can be assumed, which can correspond to a single shot detection limit of ~22% in a targeted mode. Multiple co-additions of luminescence images and Raman spectra can facilitate a several hundred ppb detection limit for luminescence and <1% for Raman spectra. Targeted mode luminescence spectra with multiple co-additions will allow a <1 ppb detection limit.

TABLE I

Summary of Example Detection Limits

| Mode | Technique | Single-Shot Detection Limit | with co-adds |
|---|---|---|---|
| Survey | Luminescence Imaging | 10 ppm | ≤1 ppm |
| Targeted | Raman Spectroscopy | 22% | ≤2% |
| Targeted | Luminescence Spectroscopy | 10 ppb | ≤1 ppb |

GENERAL CONSIDERATIONS

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

As used herein, emission, light, and laser pulses generally refers to electromagnetic radiation at wavelengths of between about 100 nm and 10 µm, though various ranges can be applied where convenient based on available detectors, lasers, and applications. In some examples, propagating optical radiation is referred to as one or more beams having diameters, asymmetric fast and slow axes, beam cross-sectional areas, and beam divergences that can depend on beam wavelength and the optical systems used for beam shaping. Beam divergences and diameters, e.g., along a slow axis or fast axis (or both) can be adjusted with one or more lenses, prisms, or mirrors to provide selected beam characteristics. Beam cross-sectional areas, diameters, or other beam dimensions can be described using boundaries that generally correspond to a zero intensity value, a 1/e value, a $1/e^2$ value, a full-width half-maximum (FWHM) value, or other suitable metric.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. An apparatus, comprising:
divergence optics removably coupled to receive a probe beam in a first imaging mode to cause the probe beam to diverge before impinging on a first area of a target surface, and to not receive the probe beam in a second imaging mode to cause the probe beam to impinge on a second area of the target surface smaller than the first area;
collection optics configured to receive, in response to the probe beam, luminescence light emitted from the first area and spectral light emitted from the second area; and
an optical detector coupled to the collection optics, wherein the optical detector includes a luminescence imaging detector portion and a spectral imaging detector portion adjacent to the luminescence imaging detector portion, wherein the luminescence imaging detector portion is configured to receive the luminescence light emitted from the first area and the spectral imaging detector portion is configured to receive the spectral light from the second area.

2. The apparatus of claim 1, wherein the divergence optics include a lens, reflector, diffuser, or a combination, wherein the divergence optics are configured to produce a conical divergence in the probe beam of at least 5°.

3. The apparatus of claim 1, wherein the divergence optics include a beam homogenizer configured to reduce a non-uniformity of the intensity distribution of the probe beam.

4. The apparatus of claim 1, further comprising an actuator coupled to the divergence optics and configured to move at least a portion of the divergence optics from a path of the probe beam so that the probe beam is directed to the target surface without being imparted with a beam divergence with the divergence optics.

5. The apparatus of claim 4, further comprising a controller coupled to the actuator and configured to control movement of the divergence optics based on an imaging mode command.

6. The apparatus of claim 4, wherein the actuator comprises a lens wheel or a movement stage.

7. The apparatus of claim 4, further comprising coupling optics configured to direct the probe beam to the target along a co-boresight path of the collection optics.

8. The apparatus of claim 7, further comprising beam adjustment optics configured to receive the probe beam along the co-boresight path in the first imaging mode and to adjust a direction of the probe beam to be approximately coaxial or parallel with an optical axis of the collection optics.

9. The apparatus of claim 1, wherein the collection optics include spectrometer optics configured to receive a portion of the luminescence light or the spectral light and to disperse and direct the portion to the spectral imaging detector portion of the optical detector.

10. The apparatus of claim 9, wherein the spectrometer optics comprise a pick-off mirror, slit, diffraction grating or grism, and one or more focusing lenses.

11. The apparatus of claim 1, further comprising a pulsed laser source configured to produce the probe beam and to direct the probe beam along a probe beam path, wherein the divergence optics are removably coupled to the probe beam path to receive the probe beam and produce the divergence in the first imaging mode.

12. The apparatus of claim 11, further comprising a pulse generator coupled to the pulsed laser source and the optical detector and configured to control the generation of pulses by the pulsed laser source, wherein the optical detector is gated in relation to a timing of the pulse generator.

13. The apparatus of claim 12, wherein the optical detector is part of a detection unit that includes a detection intensifier configured to amplify a signal of the collected luminescence light and spectral light, wherein a gate timing of the detection intensifier is determined relative to the generation of pulses.

14. The apparatus of claim 11, wherein the pulsed laser source is configured to emit laser pulses at a wavelength between 10 nm and 10 µm.

15. The apparatus of claim 1, further comprising a stand-off configured to provide a predetermined distance between the divergence optics and the target surface in the range of 10 cm to 10 m, or a high f-number, fixed focus lens configured to provide a large depth of field.

16. The apparatus of claim 1, wherein the optical detector is an intensified time-gated detector.

17. The apparatus of claim 1, wherein the optical detector comprises a CCD, EM-CCD, fast-gated CMOS, and/or APD.

18. The apparatus of claim 1, wherein the optical detector is configured to detect luminescence and/or Raman spectral signatures.

19. The apparatus of claim 1, further comprising an optical filter configured to block at least a portion of scattering probe beam light from reaching the optical detector to reduce a damage to the detector and/or reduce a saturation of the detector that would hinder detection of the luminescence light and/or spectral light.

20. The apparatus of claim 19, wherein the optical filter includes a notch filter and/or long-pass filter.

* * * * *